3,189,445
BINARY NICKEL BASE ALLOYS
Vincent P. Calkins, Cincinnati, Earl S. Funston, Hamilton, and James A. McGurty, Cincinnati, Ohio, assignors to the United States of America as represented by the United States Atomic Energy Commission
No Drawing. Filed Dec. 31, 1956, Ser. No. 631,977
3 Claims. (Cl. 75—170)

This invention relates to new nickel base alloys and more particularly to binary nickel alloys which contain from 5 to 25 weight percent of a rare earth metal selected from the group consisting of samarium, europium, and gadolinium. These alloys are useful for the manufacture of control elements to be employed in neutronic reactors.

Previous to this invention control rods for neutronic reactors have been made from cadmium or from boron or boron compounds. Cadmium control rods cannot be used if the reactor is to be operated at a temperature above the relatively low melting point of cadmium. Boron control rods suffer from the disadvantage that when neutrons are captured by the boron, alpha particles are emitted, and these alpha particles because of their short relaxation length dissipate energy locally in the form of heat. This causes the boron control rods to become excessively hot.

This invention has an object to provide oxidation resistant alloys which can be utilized in the manufacture of control rods for neutronic reactors. A further object is to provide alloys from which control rods can be fabricated which will not melt when the reactor is operated at moderately high temperatures. A still further object is to provide a material from which control rods can be made which will not become excessively hot due to the local generation of heat caused by neutron capture. Other objects will appear hereinafter.

These objects are accomplished by the following invention in accordance with which binary nickel alloys containing from 5 to 25 weight percent of samarium, europium, or gadolinium are made.

The alloys containing samarium will be discussed first.

The use of samarium as a neutron absorber is desirable because in addition to having a very high thermal neutron cross section, it produce little local heat upon neutron capture. The n-gamma reaction resulting from neutron capture does not produce the type of localized heat which is produced when boron control rods are employed.

Nickel base alloys containing 5, 10 and 15 weight percent of samarium were made by melting. Each of the alloys was arc-melted in the form of a button. Each alloy was melted four times in a tungsten arc furnace using helium as a protective atmosphere. Each homogenized button was then cut up into small test specimens for metallurgical and analytical evaluations and cross-section analysis.

Each sample was given a 100 hour static oxidation resistance test at 2200° F., and the depth of oxide penetration was measured. This penetration was found to be approximately 0.05 inch. In all cases the oxidation was found to be quite uniform, and variation in samarium content over the range studied did not appreciably affect the oxidation resistance of the alloys.

It was found that these alloys were workable at 2200° F., although in the case of the alloys containing more than 10% of samarium special procedures had to be used in order to work this material. Room temperature hardness value for the 5% samarium alloy was found to be 54–55 Rockwell A; for the 10% samarium alloy it was found to be 61–62 Rockwell A.

Europium can be substituted for samarium in these alloys, and alloys of similar metallurgical properties are thereby obtained.

The alloys containing gadolinium will now be discussed.

Gadolinium as a neutron absorber is desirable because in addition to having a high thermal neutron cross-section little local heat is produced upon neutron capture. Gadolinium which gives off gamma radiation after capture of neutrons, does not dissipate the heat thus produced locally within the control rod in contradistinction to boron.

The binary Ni-Gd alloys made and studied contained 5, 10, 15, 20, and 25 weight percent of gadolinium. These alloys were made homogenous by melting them several times in a tungsten arc furnace using helium as a protective atmosphere. Each homogenized button was then cut up into small test specimens for metallurgical and analytical evaluations and cross section analysis.

Samples of the various gadolinium alloys were given a 100 hour static oxidation test at 2200° F., after which each sample was examined metallographically to determine the amount and mechanism of oxidation. In all cases, evaluations revealed that the oxidation was quite uniform of an order of 0.01 inch. Measuring the depth of oxide penetration on all alloys showed that increase or decrease in gadolinium content did not affect the oxidation resistance of the alloy.

It was found that the 5% gadolinium alloy was workable at 2050° F. and that the 10% gadolinium alloy could be worked at temperatures as low as 2000° F. without cracking. Workability studies indicated that alloys containing 15% or more of gadolinium could not be fabricated into form by working without developing surface cracks because of brittleness.

The hardness of the 5% gadolinium alloy was 59 Rockwell A, and that of the 15% gadolinium alloy was 60 Rockwell A.

These newly developed nickel-gadolinium alloys have superior neutron absorption characteristics and are capable of operating in temperatures as high as 2200° F. without suffering adverse effects due to oxidation.

All of the alloys mentioned herein make useful control elements for neutronic reactors. The alloys of this invention which contain from 5 to 10% of samarium or gadolinium are preferred since they can be more readily fabricated into suitable shapes for control elements.

Resort may be had to such modifications and variation as fall within the spirit of the invention and the scope of the appended claims.

We claim:
1. Binary alloys of nickel which consist of nickel and from 5 to 25 weight percent of a rare earth metal selected from the group consisting of samarium, europium, and gadolinium.
2. A binary alloy of nickel and samarium containing from 5 to 10 weight percent of samarium.
3. A binary alloy of nickel and gadolinium containing from 5 to 10 weight percent of gadolinium.

(References on following page)

References Cited by the Examiner

UNITED STATES PATENTS

| | | | |
|---|---|---|---|
| 708,656 | 5/55 | Fermi et al. | 75—84.1 X |
| 771,359 | 11/56 | Morana | 75—152 X |

FOREIGN PATENTS 459,848   1/37   Great Britain.

OTHER REFERENCES

The Reactor Handbook, vol. 3, Materials, GPO, Washington, D.C., pages 5, 215, 243 (copy in Sci. Lib.).

Withers: U.S. AEC Document DP-132, September 1955, 10 pages. Copy in Div. 46, Patent Office.

DAVID L. RECK, *Primary Examiner.*

REUBEN EPSTEIN, LEON D. ROSDOL, *Examiners.*